United States Patent
Noguchi et al.

[15] 3,668,048
[45] June 6, 1972

[54] PLASTIC EGG PACKAGE SPOT WELDING APPARATUS

[72] Inventors: Hikoji Noguchi; Yoshinobu Miyazato, both of Tokyo, Japan

[73] Assignee: said Noguchi, by said Miyazato

[22] Filed: Nov. 14, 1969

[21] Appl. No.: 876,906

[30] Foreign Application Priority Data

| Feb. 14, 1969 | Japan | 44/10912 |
| Feb. 14, 1969 | Japan | 44/10913 |
| Dec. 23, 1968 | Japan | 43/112452 |
| Dec. 23, 1968 | Japan | 43/112453 |
| Dec. 23, 1968 | Japan | 43/112454 |
| Dec. 28, 1968 | Japan | 44/501 |
| Dec. 28, 1968 | Japan | 44/502 |
| Dec. 28, 1968 | Japan | 44/503 |
| Jan. 7, 1969 | Japan | 44/2071 |
| Feb. 5, 1969 | Japan | 44/10035 |
| Feb. 8, 1969 | Japan | 44/11044 |
| Feb. 13, 1969 | Japan | 44/12583 |
| Feb. 14, 1969 | Japan | 44/12584 |
| Feb. 14, 1969 | Japan | 44/12585 |
| Mar. 19, 1969 | Japan | 44/24608 |

[52] U.S. Cl. ............... 156/583, 156/272, 156/380, 53/376
[51] Int. Cl. ............... B30b 15/34, B29c 27/04
[58] Field of Search ............... 156/583, 380, 272; 58/37, 38, 58/39, 41, 44; 53/30, 376

[56] References Cited

UNITED STATES PATENTS

| 2,668,403 | 2/1954 | Rumsey, Jr. | 53/30 |
| 3,092,945 | 6/1963 | Wizelman | 156/583 X |
| 3,012,182 | 8/1963 | Oelze et al. | 156/583 X |
| 3,331,183 | 7/1967 | Gass | 53/37 |
| 3,377,768 | 4/1968 | Burt | 53/38 |
| 3,436,894 | 4/1969 | Sorensen | 53/39 X |

Primary Examiner—Benjamin A. Borchelt
Assistant Examiner—J. J. Devitt
Attorney—Browdy & Neimark

[57] ABSTRACT

Apparatus for continuously sealing the flange of the cover to the flange of the body of a plastic egg package with a plurality of spot welds using intermittently moving receiving boxes adapted to hold the body of the egg package with the flange of the body resting thereon with the cover thereof protruding outside thereof and means for closing the cover tightly against the body for spot welding the flanges.

13 Claims, 29 Drawing Figures

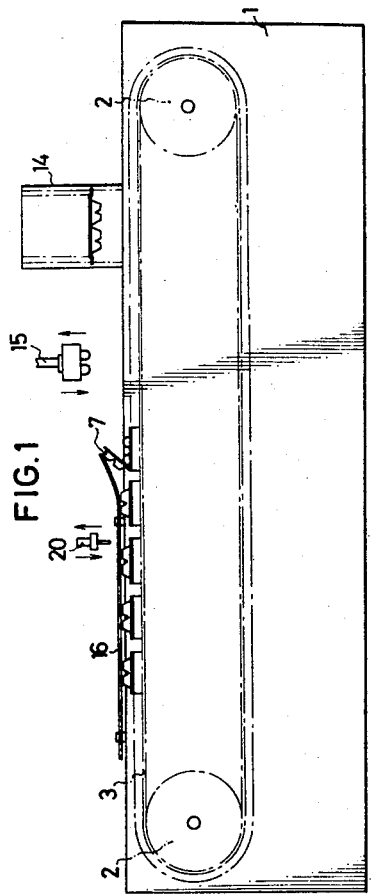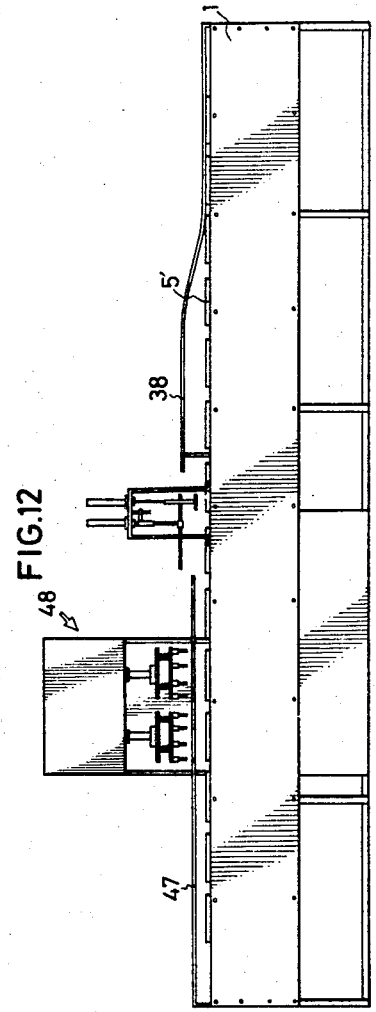

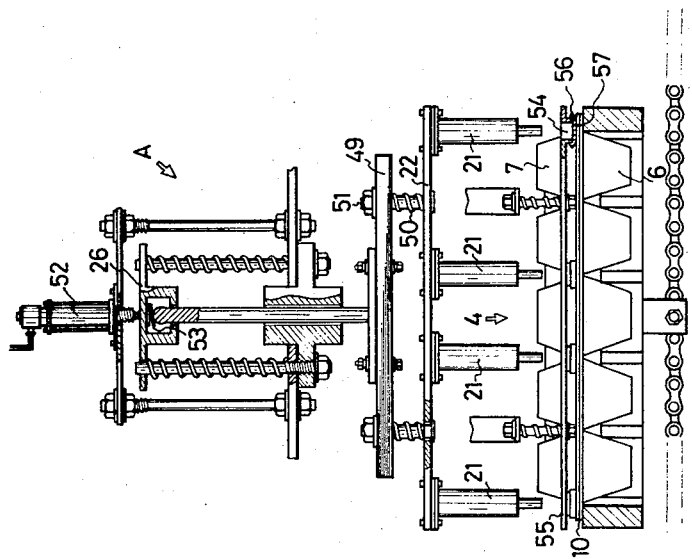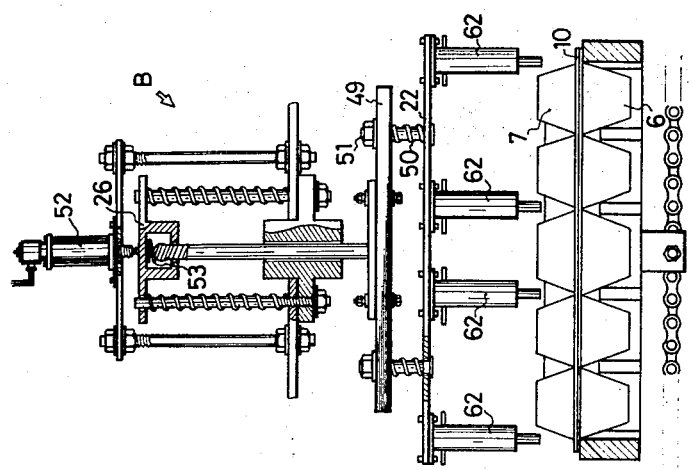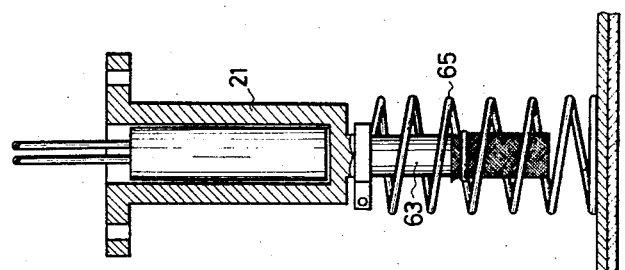

PLASTIC EGG PACKAGE SPOT WELDING APPARATUS

This invention relates to equipment for automatically covering egg packages of synthetic resin such as vinyl chloride after packing the eggs therein.

A more specific object of this invention is to provide equipment for the automatic heat-welding of egg packages made of a synthetic resin such as vinyl chloride.

Another object is to facilitate the operation of heat-welding by use of a moving receiving box of a particular design adapted to receive only the body of the container for eggs, which container is made up of a body and a cover.

Another object is to provide a parallel system of receiving boxes in order to continue the packaging operation in a more efficient manner.

Another object is to provide cooling equipment of special design to shorten the heat-welding time as much as possible, giving an instant cooling to the welded points and to complete the operation with a shortened and simplified procedure.

These and other objects as well as the advantageous points of this invention will more fully be disclosed in the following description, made in connection with the accompanying drawings, wherein like reference characters refer to the same or similar parts throughout the several views and in which:

FIG. 1 is a vertical side view of the equipment which embodies the fundamental structure of the invention;

FIG. 12 is a side view of a second embodiment of the automatic covering equipment for the egg packages;

FIGS. 14, 15, 16 show the moving receiving box to be used in FIG. 12, in which FIG. 14 and FIG. 16 are perspective views, and FIG. 15 is a cross-sectional view of FIG. 14;

FIG. 22 is a side view of the automatic heat-welding equipment used in FIG. 13;

FIG. 25 is a vertical sectional view of another embodiment of the heating part of the welding rod;

Figure 2:
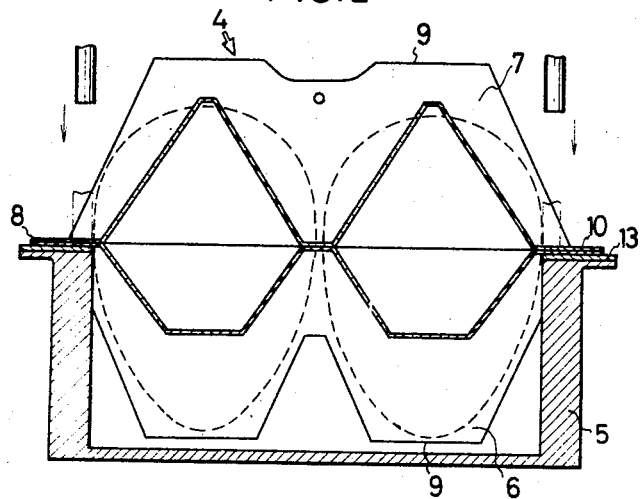
FIG. 2 is a vertical side view of the moving receiving box used in the present invention wherein the egg package has been placed in the receiving box which moves to heat-welding.
Figure 3:
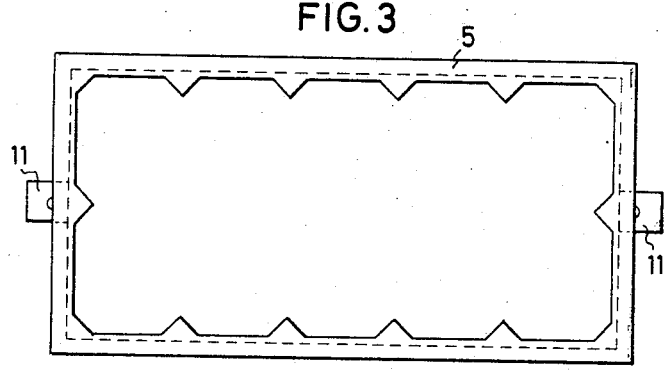
FIG. 3 shows a top plan view of the moving receiving box shown in FIG. 2.
Figure 4:
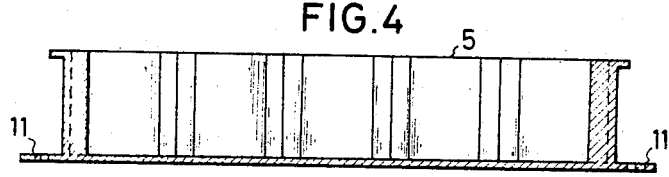
FIG. 4 shows a sectional view of the box of FIG. 3.
Figure 5:
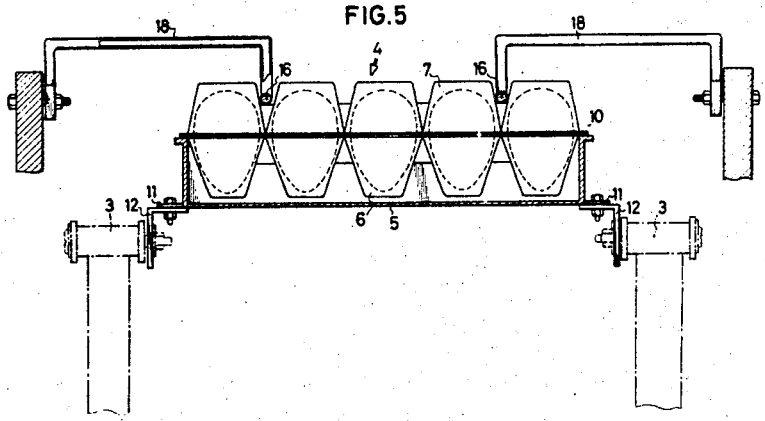
FIG. 5 is a vertical front view of the egg package in the receiving box, equipped with the covering mechanism which covers the package as it moves.

The following illustrative embodiments of the invention will be described as to refer particularly to FIG. 1 of the drawings, which is a side view thereof with most of the present invention provided in its construction. The body 1 is a frame of rectangular shape to which a pair of chain sprocket wheels 2,2 are attached by a shaft at each end of the frame body 1, in order to rotate them. The pair of chain sprocket wheels 2,2 are provided so that one side is a free chain sprocket wheel and the other is a driving chain sprocket wheel. These chain sprocket wheels are arranged and chained in a pair 3 to run and circle in a parallel line. These chains 3 are fixed to the moving receiving boxes 5 which can each accommodate one egg package 4, as shown in FIG. 2 and FIG. 5. Each egg package consists of a body 6 and a cover 7 which are integrally attached at one side, and are adapted to be bent with respect to one another. Both the body 6 and the cover 7 have concave portions 9 as shown clearly in FIG. 2, around which the flanges 10 form to join the body 6 and the cover 7 together horizontally. This egg package 4 is made of a plastic material. The moving receiving box 5 described above receives only the body 6 of the said egg package 4 while the cover 7 remains outside. The moving receiving box 5 is formed of a metal casting, equipped at both sides with the jutting pieces 11,11 which are fixed to the L-shaped metal fittings 12 by bolts. The metal fittings 12 are fixed to the chain 3,3 as shown in FIG. 5. A plurality of the moving receiving boxes 5 are arranged with a little space between each. The chain 3,3 moves intermittently as far as its fixed length and then stops. On the upper side of the moving receiving box 5 are stuck thin pieces 13 of plastic material.

On the top of the frame body 1 there equipment 14 is provided to put each egg package 4 separately into the moving receiving box 5 and also equipment 15 to distribute the eggs automatically into the package. Details of this equipment are omitted since it does not have anything to do with the essential features of the present invention.

Figure 6:
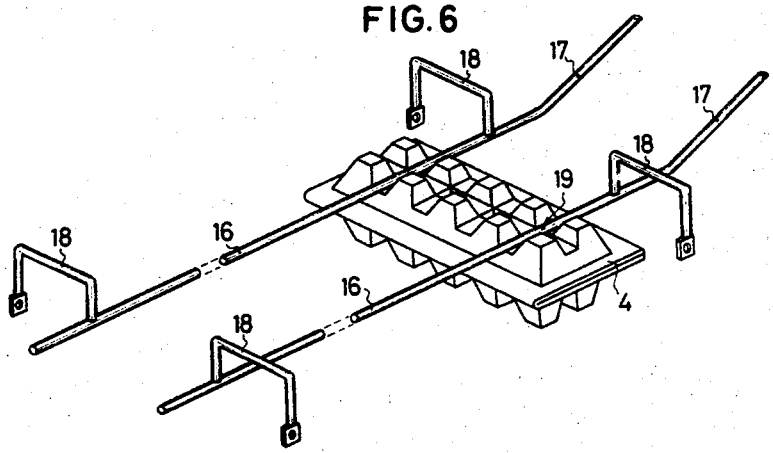
FIG. 6 is a perspective view of the equipment shown in FIG. 5.

At the upper side of the body 1 or above it is provided a pressing bar 16 which presses the cover 7 of the egg package 4 as it passes through. The action of the pressing bar 16 is shown clearly in FIG. 5 and FIG. 6. The pressing bar 16 is curved upwardly at the entrance side then stretches forth in a lower level. The pressing bar 16 is secured by several fixing bars 18 at appropriate points, and is arranged to press against the concave parts which exist between the convexities of the cover of the egg package which is adapted to receive the eggs therein. The egg package 4, in general, can accommodate 10 eggs in a double line with 5 eggs on each side; thus the egg package has 4 rows of concavities 19, and the pressing bars 16 are adapted to press the first row of these concavities on each side, as shown in FIG. 6.

Figure 7:
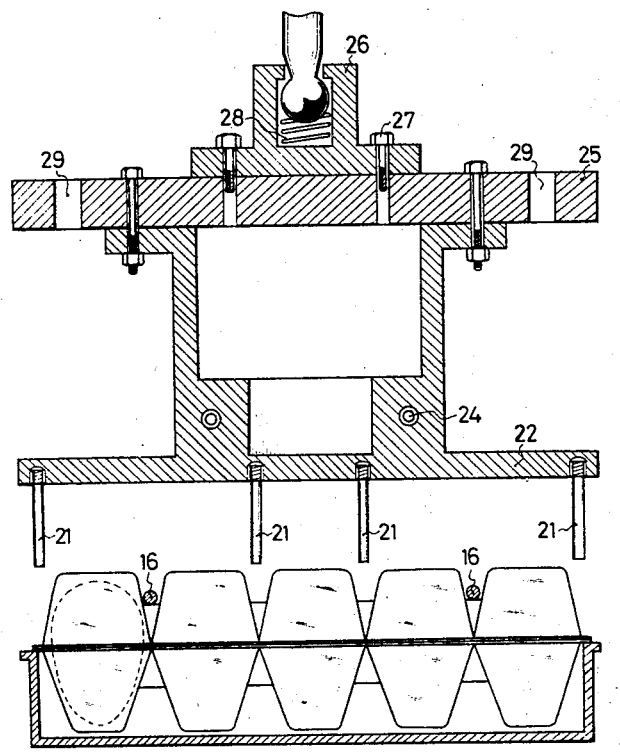
FIG. 7 is a vertical front view of the egg package showing its covering part and body ready to become heat-welded.
Figure 8:
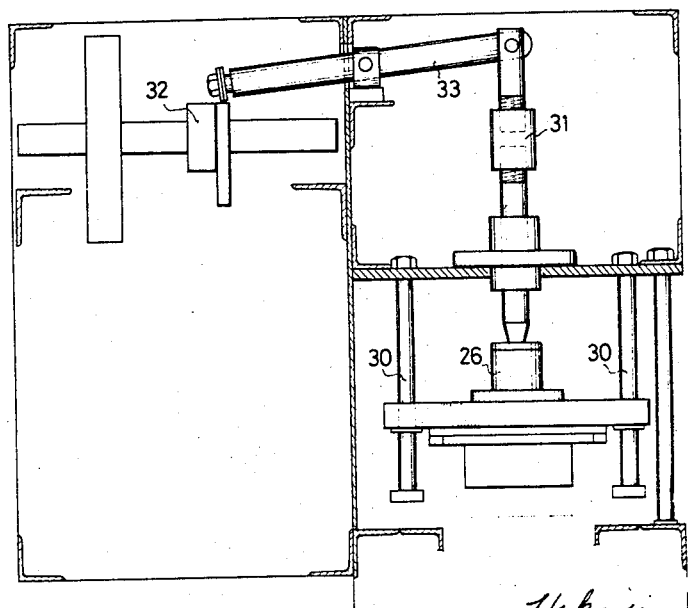
FIG. 8 shows the actual mechanism which causes upward and downward movement of the heat-welding equipment as shown in FIG. 7.
Figure 10:
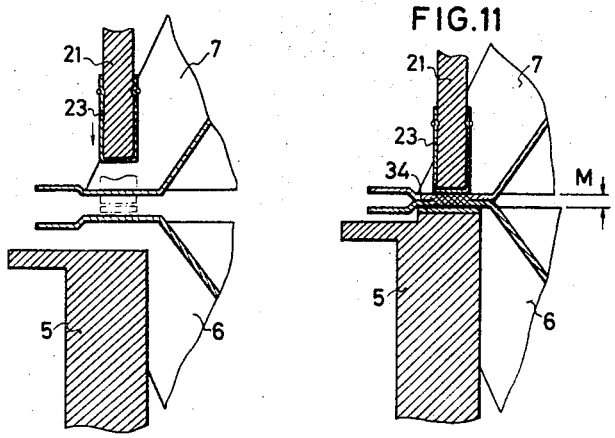
FIG. 10 is a vertical side view showing the defective state which can take place when heat-welding.

In FIG. 1 numeral 20 shows the welding equipment, which is shown in FIGS. 7 and 8 in detail. In FIG. 7, numeral 21 represents the welding rods to give heat when welding. The welding rods 21 which descend and ascend give the heat-welding, and as shown in FIG. 7, the several welding rods are arranged at the bottom side of the fitting 22 so as to be able to touch the spots where heat-welding is to take place. This figure shows the welding rods 21 as simple bars, however, the heat-welding source is placed inside the welding rods 21, as shown in FIG. 25. At the tip of the welding rod 21, as shown in FIG. 10, a piece of a membrane of Teflon 23 is put on. The fitting 22 is installed with the heat source 24 in order to give heat to the welding rods 21. The upper side of the fitting is fixed by nut bolts to the lower part of the guided panel 25 on which the universal joint 26 is fixed by nut bolt 27. Inside the universal joint 26 is the spring 28 which in short serves as the power adjustment for the welding rods 21 to work smoothly. At both sides of the guided panel 25 are two vertical holes 29 through which the guide bars 30 extend downward from the upper side. The other end of the upper side of the universal joint is fixed by shaft to an end of the working bar 33 which serves as a cam mechanism via turnbuckle 31. In this embodiment a cam mechanism is used which can be replaced by an air cylinder.

Figure 9:
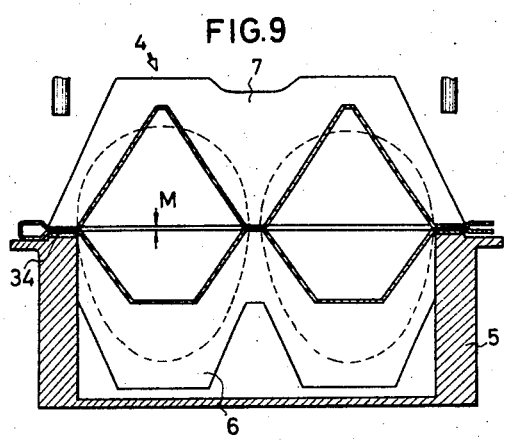
FIG. 9 shows a vertical side view of another embodiment of the moving receiving box which conforms to the shape of the flange of the egg package.

FIG. 9 shows another embodiment of the moving receiving box 5. Eggs inside the egg package 4 can be kept safe and long, if the covering is slightly opened in order to supply fresh air constantly through the opening M. Accordingly, the egg package, so as not to be completely closed as shown in FIG. 2, should be jotted out a little upwardly of the welding part. As shown in FIG. 10, if the welding rod 21 would go down on the flange 10 of the said egg package 4, which is sort of floating in the air and not fixedly placed on the frame body 1, it could make a hole on the plastics before welding, thus giving quite unsatisfactory welding.

Figure 11:
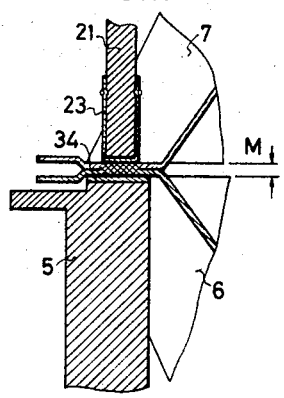
FIG. 11 shows the state of correct heat welding.

However, as shown in FIG. 11, the present invention provides a small projection 34 on the upper side of the moving receiving box 5 which is available to give the opening M between the body 6 of the egg package 4 and the cover 7 when welded.

Figure 13:
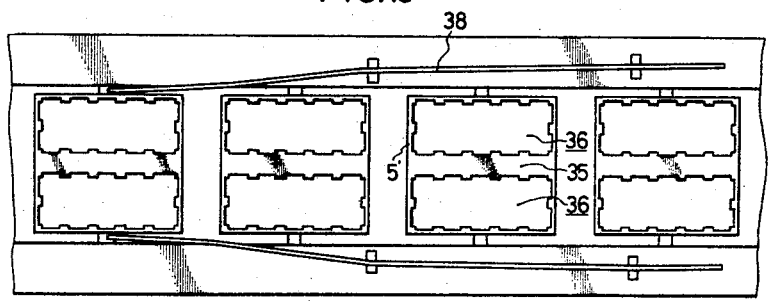
FIG. 13 is a top plan view showing the moving receiving box and a part of the covering equipment.
Figure 14:
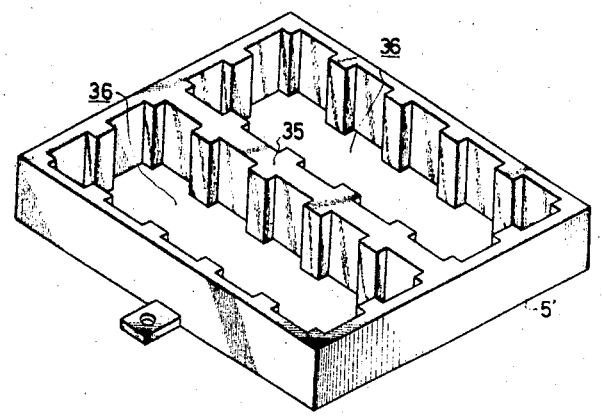
Figure 15:
Figure 16:
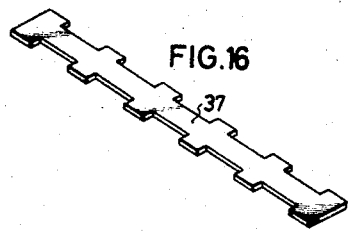

FIG. 12 shows a much improved automatic covering equipment form those shown in FIGS. 1–11. FIGS. 1–11 show the automatic covering equipment which is available only for one single line of egg packages 4 as shown clearly in FIG. 6, the longer side of the egg package 4 meeting at right angles with the heading direction of the equipment; however, FIG. 12 shows the example in which the egg packages 4 are drawn in a double line with the longer side parallel to the heading direction of the automatic covering equipment to permit welding of two packages at the same time. To explain the mechanism shown in FIG. 12, numeral 5' is the moving receiving box to move the egg packages 4, and is divided into two at the center part by a rather wide dividing bar 35, as shown in FIGS. 13 and 14, both sides of which act as receivers 36,36 in a double parallel line to receive egg packages 4 with their long sides parallel to the heading direction of the equipment. In short, each box is available to receive two egg packages at the same time. The dividing bar 35 at the center has a thin piece of plastic 37 sticking to it as shown in FIGS. 15–16.

Figure 18:
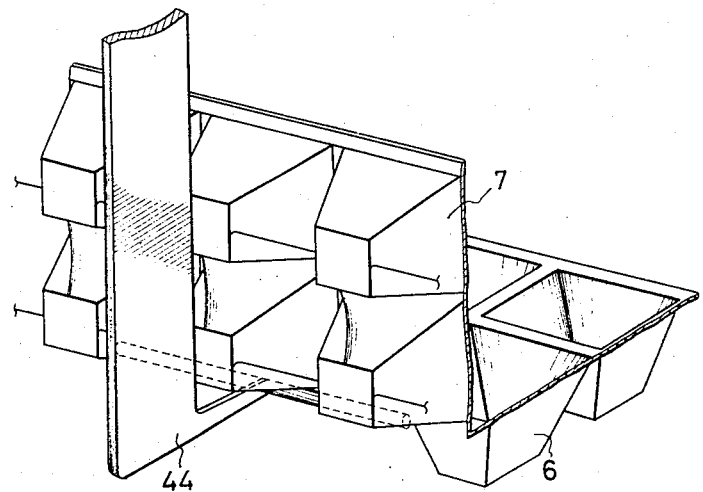
FIG. 18 is an enlarged perspective view of the critical part of the covering equipment shown in FIG. 13.
Figure 19:
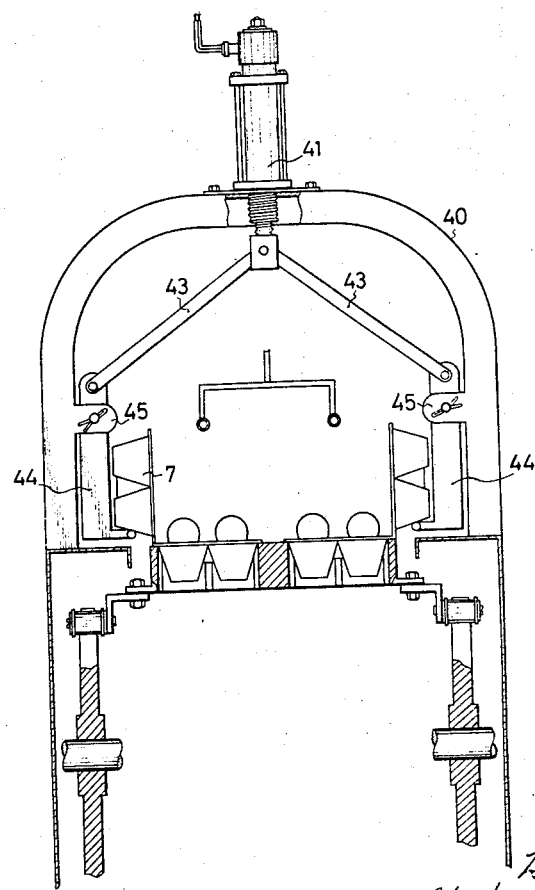
FIG. 19 is a front view of the mechanism as a whole which actuates the covering equipment.
Figure 20:
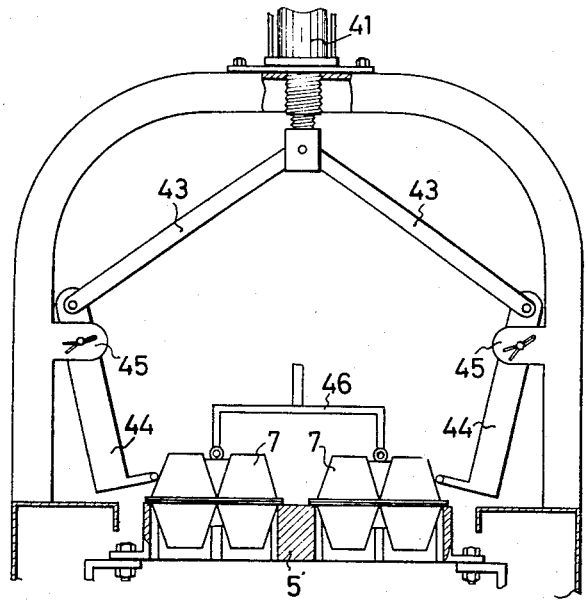
FIG. 20 is a front view of the mechanism as shown in FIG. 19 in operation.
Figure 21:
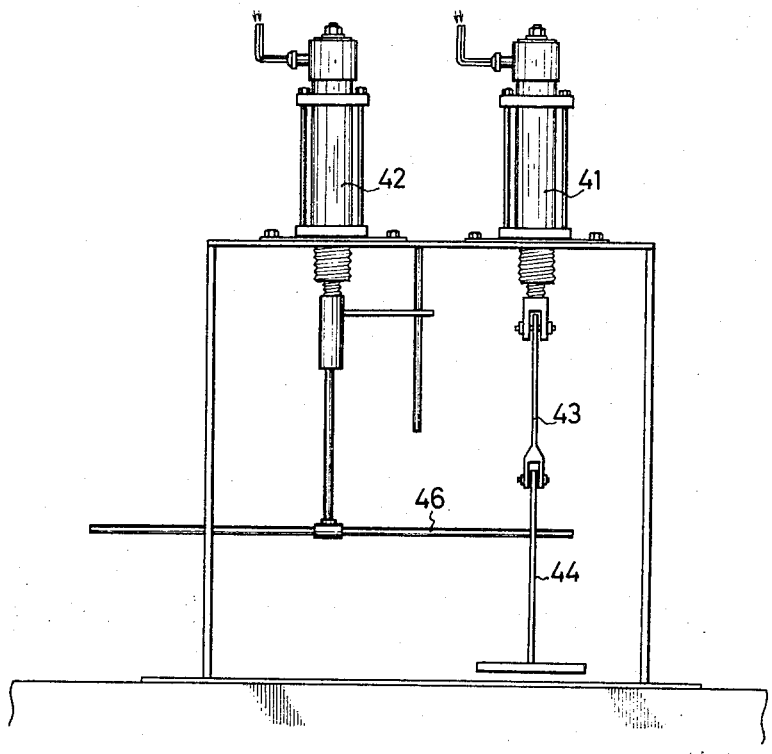
FIG. 21 is a side view of FIG. 19.
Figure 23:
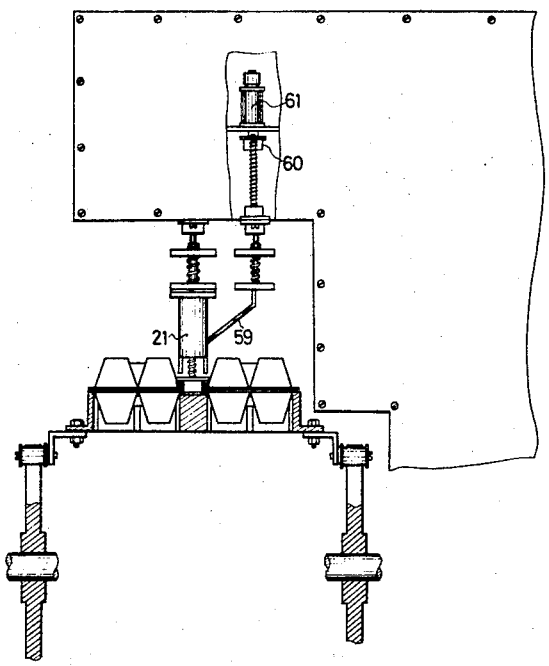
FIG. 23 is a front view of the automatic heat-welding equipment as shown in FIG. 22.
Figure 24:
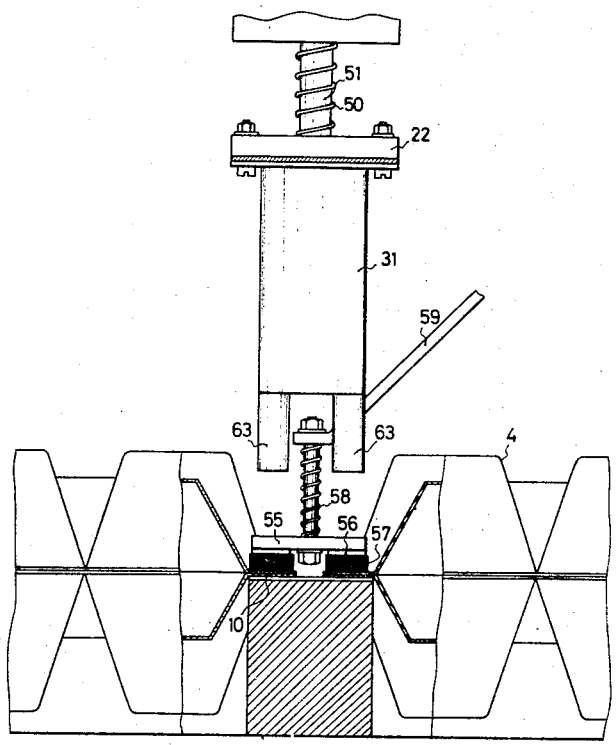
FIG. 24 is an enlarged front view of the essential part of the mechanism shown in FIG. 23.

In FIG. 12, number 38 is the guide bar to make the cover of the egg package stand upright, and is different from that shown in FIGS. 1–11. The guide bars 38 are fixed lower at the beginning, then rise higher and become gradually closer to each other toward the center on both sides of the top of the frame body 1 supported by stays 39. At the ending part of the guide bar 38 for the cover 7, which stands erect, there is provided a device to completely close the cover which is shown in FIGS. 18–21. A frame 40 is provided over the body 1 above to which two air cylinders 41,42 are fixed in parallel to the heading direction. Below the one cylinder 41, two connecting rods 43 are fixed by shafts under which the upper side of the rocking arms 44 are also fixed by shaft. As seen clearly in FIG. 19, the upper part of the rocking arm 44 is fixed by shaft to the projection 45 inside the frame 40 and its lower end is arranged to touch the cover 7 of the egg package 4. In other words, the cover 7 of the egg package held erectly by the air cylinder 41 is then shut and closed. A pushing bar 46 is attached below the other air cylinder 42 in order to hold the cover 7 tight from the upper side which has been shut by the rocking arm or rocking bar 44. The two-way push bar 46, as seen in FIG. 19, is able to hold the two egg packages 4 perfectly tight at the same time on both right and left hand side. Next to this covering mechanism is a cover pusher 47 or horizontal cover pushing bar in order to transfer the egg package without opening the cover. The welding mechanism 48 is provided midway. FIGS. 22–24 show the welding mechanism.

As shown in FIG. 22, the welding mechanism is composed of two parts A and B. These two parts are arranged close to each other in the direction of movement. A is a welding equipment while B is a cooling equipment. Several welding rods 21 containing a heat source inside, arranged in the direction of movement, are attached to the bottom side of the fitting 22 in order to touch exactly the welding points on the flange 10 of the cover 7 and the body 6 of the egg package 4, when welding. Above the fitting 22, a bumper panel 49 of metal is attached to the fitting 22 through springs 50, which is pushed by the power of the coil springs 50. Numeral 51 are the pins to slide down in order to prevent the coil springs 50 form bending when pressures are given thereby giving an even power of the coil springs to each welding rod 21 below. The pins 51 are provided in the center of the coil springs 50. The metal panel 49 is connected to the universal joint 26, above which is provided the air cylinder 52 which causes the welding rods 21 to move downwardly. Another coil spring 53 is placed in the universal joint 26. At the bottom end of each of the welding rods 21 there is provided a pressure panel 55 with through holes 54 in which the welding rods can pass through. Each through hole 54 of the pressure panel 55 also provides a ring 56 protruding downward, each has an attached thin fragment 57 of plastic material. The pressure panel 55 is connected to the lower end of the bent bar 59 via spring 58. The upper part of bent bar 59 is connected to the air cylinder 61 via the universal joint 60, as shown in FIG. 23.

Next to the welding mechanism A is located the cooling mechanism B. The structure of cooling mechanism B lacks the pressure panel 55 for the welding mechanism, as well as the structure to move the pressure panel 55 up and down and further, the welding rods 21 are replaced by the cooling rods 62. Besides these, there are no other differences between the structures of A and B. The structure of each cooling rod 62 is a simple round shaped bar without having any heating equipment. In other words, cooling is done by the cool metal bar. The effect of cooling, naturally, is improved by using cooling pipe 62, as shown in FIG. 26, having water 62' inside.

In accordance with FIG. 24, the welding rods 21 hold a heating source inside under which a pair of welding noses 63 are attached to hang down in order to weld the flange 10 of the egg packages 4 standing in a double row at the same time.

Figure 26:
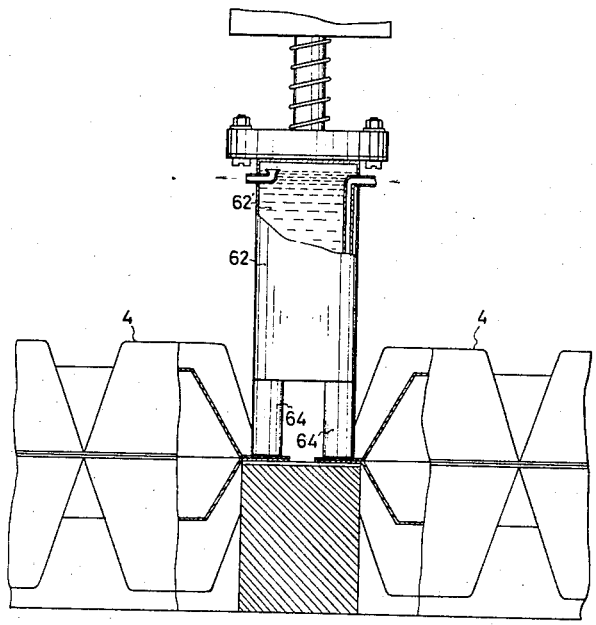
FIG. 26 is a cross-sectional front view of one part of another embodiment.

The cooling rods have the same appearance as shown in the FIG. 26, under which a pair of cooling noses 64 are attached to hang down in order to cool the two egg packages 4 at the same time.

FIG. 25 also shows another embodiment which eliminates the pressure panel 55. At the root of the welding nose 63 the upper side of the coil spring 65 of larger internal diameter is fixed and the lower end of the coil spring is extended far lower than the welding nose. The purpose of the pressure panel 55 is to place pressure on the flanges of the egg package 4 prior to the welding rods 21 coming down to give effective welding. FIG. 25 shows a much simpler example by using the coil spring 65, the lower end of which places pressure on the flanges before the welding rods drop. This is in theory, but in practice it has a shorter life as the coil springs 65 tend to get bent.

Figure 27:
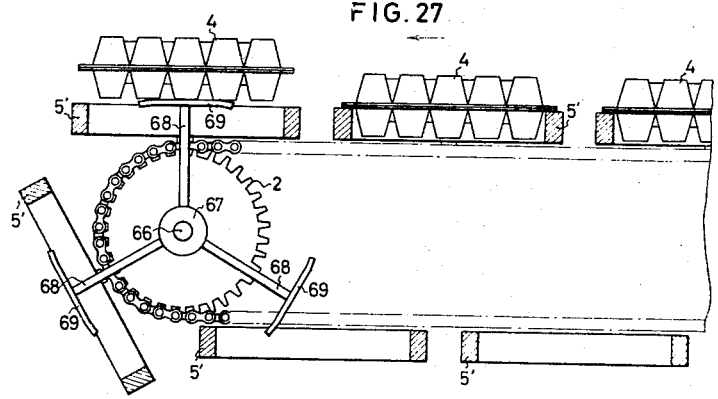
FIG. 27 is a vertical side view to show the removal of the welded egg package from the moving receiving box.

Fig. 27 shows a mechanism for easily taking out the closed egg package from the moving receiving box 5. It is necessary for making the operation continuous. At the exit end of this automatic covering equipment there are provided a pair of chain wheels 2, at a center part of the shaft 66 on which one or more bosses 67 are put, to which the bases of the several arms are attached to jot them out in a radial manner. A push out panel 69 is fixed at the tip of each arm of enough length to thrust out the egg package 4.

Figure 28:
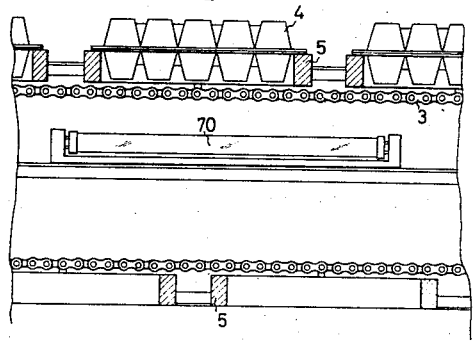
FIG. 28 is an enlarged view of part of an egg tester.

FIG. 28 is an egg tester. At a certain appropriate place under the moving receiving box which moves intermittently, there are provided electric lights to detect broken eggs to be removed.

The operation of the present invention is as follows:

The basic pattern is shown in FIGS. 1–11. An appropriate power source gives power to rotate the chain sprocket wheel 2, moving the chain in a counterclockwise rotation intermittently. The plurality of moving receiving boxes are attached onto the chain to move one box length, then stop for about two seconds and then go on again.

In FIG. 1, when an automatic egg package supplying device is provided, it feeds the egg package to the moving receiving box, but only the body 6 of which rests inside and the cover 7 of the egg package 4 remains outside. If this automatic egg package supplying device 14 is not provided, of course they can be fed to the moving receiving boxes manually. It is not difficult, even if the eggs are to be packed by hand, together with egg testing. While the moving receiving box is moving by the intermittent rotation of the chain, eggs are put in the egg packages by the automatic egg supplying device. And the cover 7 of the egg package 4, being attached to the body 6 stands naturally at around 45 degrees due to the elasticity of the plastic material, moving forward to meet the front edge 17 of the pressing bar 16 which curves upward. As shown in FIG. 1, the cover 7 of the egg package 4 is shut gradually as it moves. The pressing bar 16, being placed just at the central concavity of the egg package, causes the egg package to shut smoothly. When the package arrives under the welding equipment, it stops about 2 seconds, while the welding rods come down to cause heat welding at four points on the flange 10 of the cover 7 and the body 6, with the power of coil spring 28 through the universal joint 26 via cam mechanism 32. The pressing bar 16 stretches long towards the end so that it keeps the egg package pressed until the heat-welded points cool down in a natural manner and natural speed. In this example, the moving receiving box which is shown in FIG. 9 proves quite sufficient as it has projection 34 on its upper side for the egg package to receive against the flange 10. As shown in FIG. 9, the egg package 4 is welded, having a slight opening M between the flanges 10 outward of the body 6 and the cover 7, serving for a free flow of the fresh air. For this sole purpose, concavities are provided on some portions of the flanges, which are joined together to be welded, with the non-concaved parts of the flanges 10 of the body 6 and the cover 7 becoming the opening M. The projection 34 goes with the concaved parts of the flanges 10 as the receiver, when welded, can prevent the concaved parts form melting and breaking through even if the plastic materials meet the welding heat. Further explanations are to be given the improved form shown from FIG. 12 thereinafter.

Figure 17:
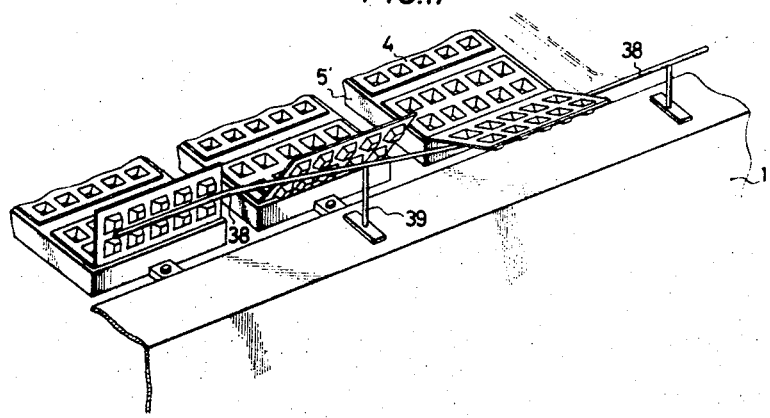
FIG. 17 is a perspective view of the equipment shown in FIG. 13.

The egg packages 4 are, as shown in FIG. 17, arranged facing each other inside the box with its covers 7 remaining outward. As the moving receiving box moves the cover 7 is led to stand erect by means of guide bar 38, as the guide bar 38 curves upward then inward. Further, as shown in FIG. 18, the moving receiving box moves until the lower end of the rocking bar comes right under the erect cover 7. The air cylinder 41 above moves to give power to the rocking bar 44 to close the covers 7 (see FIG. 20) of the two egg packages at the same time by a rocking movement. The shaft at the center of the rocking movement is the central axis. As the covering by this rocking bar 44 is insufficient, another air cylinder 42 is provided next to the air cylinder 41 to actuate the two-way push bar 46 to make the covering work more complete, and then the egg package 4 is sent to below the cover pusher or the cover pushing bar 47. Accordingly, the completely covered egg package 4 goes forward to come under the welding equipment A. The covering heretofore is not complete to shut the flanges 10 and so the pressure panel 55 comes down first of all when welding to press and shut the flanges 10 perfectly with the lower face of the rings 56 attached under the panel, and then the welding rods 21 descend to heat-weld on the spot where the rings are pressing. The two coil springs 50 and 53, the latter of which is placed inside the universal joint 26, give certain adjusting power to the welding rods while descending, which ascend after welding. It is necessary to provide two power adjusting sources for the welding rods since there must be constant pressure of the welding power in order to gain a good effect on the plastic material, being not too weak and not too strong. The power of the spring can be adjusted by the nut of the pin 51. When the welding rods 21 descend the pressure panel 55 also descends but prior to it, and when welding rods 21 ascend, having finished with the welding work, the pressure panel stays still to keep pressing, and then the panel 55 ascends. This is to give more pressing on the welding points of the flanges 10 to gain an effective welding. As the moving receiving box stops moving during the welding, if the pressure panel stays long to give a long pressing on the flanges 10, it loses efficiency as a whole, so that the pressure work must finish after about 1 second at the maximum to send the moving receiving box under the cooler B. Cooling rods equipped under the cooling equipment B in the same position as the welding rods 21 are able to give a quenching when descending on the welded spots which are not yet solid. Thus a perfect quenching and solidification are given.

The cover pusher or the cover pushing bar 47 extending further ends before the terminating point, where the push out panel 69 at the end of the arms which are attached to the boss 67 around the shaft of the chain sprocket wheel 2 wait for the egg package 4 to come to be pushed out for easy removal.

The present invention is the very first successful apparatus to give a spot welding on the body 6 and the cover 7 of an egg package 4 made of plastic material. Further, this invention provides automatic covering equipment for the egg packages.

Various types of automatic packing equipment have been well known heretofore, however, the present spot welding system to attach the cover is totally new. Peripheral sealing systems have been already used, however, eggs being respiratory, it is difficult to keep them safe and fresh for long in the sealed package using those traditional technics, and so in Japan they have been using hotchkiss to fix them at a few points on the flange or with adhesives or otherwise with adhesive cellophane tape, all being done by hand labor.

None of these have been satisfactory for a number of reasons. Referring to the prior art examples, buttons or the like members are attached on both the cover and the body of the egg package to become fixed to each other. These prior art examples are defectively short of certainty when fixed, beside the material cost of the egg package being expensive enough, it does not pay if the packaging cost exceeds over the limit of ¥ 2.50 – ¥ 3.50 per one. It is far more expensive to manufacture the egg package of easy locking or the egg package with ready locking, exceeding far over these limits mentioned above.

According to the present invention, however, welding is accomplished only at several points along the flange, instead of sealing all around.

As for the egg packages concerned, no other method is more economical than the present invention as well as practical enough. The fixing method using hotchkiss is totally ineffective and further the hand labor is very fatiguing, besides the pins of hotchkiss do not work well.

The features of the present invention are as follows:

1. The plurality of moving receiving boxes 5 fixed to the rotatably circling chain and sprocket wheels are large enough to receive only the body 6 of the egg package 4, which boxes 5 also provide the projection 34 to accommodate the flanges 10 as the rest when spot welding is accomplished. According to the present invention, the egg package 4 having the body 6 integral with the cover 7 at one side, the moving receiving box 5 is only available for the body 6 to be received therein with the cover 7 staying outside. This makes the whole mechanism very simple and economical for automatic covering. The moving receiving box 5, serving as the welding rest at the same time, makes the plastic welding possible and quite simple.

2. The projection 34 is provided on the upper side of the moving receiving box 5 which permits the egg package to be fixed with slight openings M in order to supply the fresh air continuously to the eggs.

3. Spot welding is used to fix the cover 7 and the body 6 of the egg package 4. No other way can be adopted than this spot welding. Even though plastic spot-welding is very much harder, the all over sealing system is not at all suitable for supplying the fresh air to the eggs even though the sealing technique is very much easier.

4. Adoption of two-wheeled chain sprocket. Adoption of a double row of moving receiving boxes 5 facilitates the covering operation from both sides, right and left at the same time, with the welding work being done at the center, the simple structure as a whole is particularly noteworthy.

5. Particular devices are utilized for the covering mechanism. The cover 7 of the egg packages 4, being guided to stand erect by the guide bar 38, is closed first by the rocking bar 44 via the power of air cylinder 41, then by the two way push bar 46 which moves up and down via the power of the air-cylinder 42.

6. The welding mechanism which is able to facilitate spot welding is provided with coil springs to give adjusting to the pressing power, and the pressure panel 55, as spot welding on plastic materials, in practice, is not at all easy to do. Thousands of failures have finally given birth to it. The success of this device has been brought about by the idea of utilizing the coil springs as power adjusting measures for the welding rods 21 to give a constant power of welding and elasticity. The coil spring power itself also can be adjusted at times by the nut at the head of the pin 51 to find out and gain the most suited condition to work out for the particular conditions of indoor temperature and humidity as well. Coil springs 53 are also changeable to adjust their strength in accordance with the outer conditions. It is essential to give good pressure over the welding spots. If the closing of the cover 7 and the body 6 is not perfect spot welding never works sufficiently. When welding on four spots at the same time, if the pressing power is not distributed evenly all over, at least one point would escape from the welding rods. Of course, three point perfect welding is sufficient for covering though, as for the commodity goods concerned, even one tiny defect could reduce the market price.

7. Cooler B accompanying the welding equipment. This is a very noteworthy feature of this invention. With this cooler B, the spot welding becomes consolidated and certain.

Besides these features mentioned above, there are in fact many other features and characteristic points which are remarkably noteworthy in the present invention.

What is claimed is:

1. Apparatus for sealing the flange of the cover to the flange of the body of a plastic egg package which comprises
   endless belt chains moving intermittently,
   receiving boxes attached to said chains at intervals, said boxes being of a size adapted to receive the bodies of two egg packages therein in a double row with a dividing panel at the center of the box parallel to the direction of movement of the boxes, the flange of each body resting on said box with the cover thereof protruding outside thereof,
   means for closing said cover over the body of said egg package and for holding it tightly in engagement therewith, and
   means for spot welding the flanges of the body and the cover at a plurality of spots against said receiving box.

2. Apparatus according to claim 1 wherein said spot welding means includes welding rods each of which has two welding tips so that egg packages arranged in a double line can be spot welded simultaneously.

3. Apparatus for sealing the flange of the cover to the flange of the body of a plastic egg package which comprises
   endless belt chains moving intermittently,
   receiving boxes attached to said chains at intervals, said boxes being of a size adapted to receive the body of an egg package with the flange of the body resting thereon and with the cover thereof protruding outside thereof,
   means for closing said cover over the body of said egg package and for holding it tightly in engagement therewith,
   means for spot welding the flanges of the body and the cover at a plurality of spots against said receiving box, and
   a guide bar mounted over said boxes causing each protruding cover to stand erect, said means for closing said cover comprising a rocking bar to turn said erect cover down over said body and a push bar to hold said cover tight against said body, and a cover pushing bar to maintain said cover tight against said body during the spot welding.

4. Apparatus for sealing the flange of the cover to the flange of the body of a plastic egg package which comprises
   endless belt chains moving intermittently,
   receiving boxes attached to said chains at intervals, said boxes being of a size adapted to receive the body of an egg package with the flange of the body resting thereon and with the cover thereof protruding outside thereof,
   means for closing said cover over the body of said egg package and for holding it tightly in engagement therewith,
   means for spot welding the flanges of the body and the cover at a plurality of spots against said receiving box, and
   said spot welding means including a plurality of welding rods and a ring of larger diameter than the welding rod located below said welding rod, a thin fragment of plastic material covering the bottom of said ring, and means for moving said welding rods and said ring downwardly against said flanges for spot welding, said rings moving ahead of said welding rods so as to press against said flanges before said welding rods reach said flanges.

5. Apparatus for sealing the flange of the cover to the flange of the body of a plastic egg package which comprises
   endless belt chains moving intermittently,
   receiving boxes attached to said chains at intervals, said boxes being of a size adapted to receive the body of an egg package with the flange of the body resting thereon and with the cover thereof protruding outside thereof,
   means for closing said cover over the body of said egg package and for holding it tightly in engagement therewith,
   means for spot welding the flanges of the body and the cover at a plurality of spots against said receiving box, and
   means for cooling said spot welds located adjacent to but separate from said spot welding means to give an instant cooling to said spot welds.

6. Apparatus according to claim 5 wherein said spot welding means includes a plurality of welding rods, and said cooling means comprises a plurality of metal rods of similar shape and spacing as said welding rods.

7. Apparatus according to claim 6 wherein said metal rods are water cooled hollow pipes.

8. Apparatus for sealing the flange of the cover to the flange of the body of a plastic egg package which comprises
   endless belt chains moving intermittently,
   receiving boxes attached to said chains at intervals, said boxes being of a size adapted to receive the body of an egg package with the flange of the body resting thereon and with the cover thereof protruding outside thereof,
   means for closing said cover over the body of said egg package and for holding it tightly in engagement therewith, and
   means for spot welding the flanges of the body and the cover at a plurality of spots against said receiving box, said spot welding means including welding rods, means for raising and lowering said welding rods, each said welding rod having a coil spring at the base thereof extending below the tip of said welding rod for engaging said surfaces to be spot welded before contact by said welding rods.

9. Apparatus for sealing the flange of the cover to the flange of the body of a plastic egg package which comprises
   endless belt chains moving intermittently,
   receiving boxes attached to said chains at intervals, said boxes being of a size adapted to receive the body of an egg package with the flange of the body resting thereon and with the cover thereof protruding outside thereof,
   means for closing said cover over the body of said egg package and for holding it tightly in engagement therewith,
   means for spot welding the flanges of the body and the cover at a plurality of spots against said receiving box, said spot welding means including welding rods, means for raising and lowering said welding rods, each welding rod having a heating mechanism inside thereof.

10. Apparatus according to claim 9 wherein said means for raising and lowering said welding rods are air cylinders.

11. Apparatus for sealing the flange of the cover to the flange of the body of a plastic egg package which comprises
    endless belt chains moving intermittently, receiving boxes attached to said chains at intervals, said boxes being of a size adapted to receive the body of an egg package with the flange of the body resting thereon and with the cover thereof protruding outside thereof, means for closing said cover over the body of said egg package and for holding it tightly in engagement therewith, and means for spot welding the flanges of the body and the cover at a plurality of spots against said receiving box, said spot welding means including welding rods, means for raising and lowering said welding rods, and spring means between said welding rods and said means for raising and lowering them.

12. Apparatus for sealing the flange of the cover to he flange of the body of a plastic egg package which comprises
endless belt chains moving intermittently, receiving boxes attached to said chains at intervals, said boxes being of a size adapted to receive the body of an egg package with the flange of the body resting thereon and with the cover thereof protruding outside thereof, means for closing said cover over the body of said egg package and for holding it tightly in engagement therewith, means for spot welding the flanges of the body and the cover at a plurality of spots against said receiving box, and an egg tester with lighting means located below said receiving boxes.

13. Apparatus for sealing the flange of the cover to the flange of the body of a plastic egg package which comprises
endless belt chains moving intermittently, receiving boxes attached to said chains at intervals, said boxes being of a size adapted to receive the body of an egg package with the flange of the body resting thereon and with the cover thereof protruding outside thereof, means for closing said cover over the body of said egg package and for holding it tightly in engagement therewith, and means for spot welding the flanges of the body and the cover at a plurality of spots against said receiving box, said receiving box being provided with a thin piece of plastic material attached to its upper side.

* * * * *